3,288,240
AUTOMATIC STABILITY CONTROL MEANS
FOR TOWED VEHICLES
Richard M. Franzel, Rte. 1, Box 580, Mound, Minn.
Filed July 29, 1964, Ser. No. 385,921
8 Claims. (Cl. 180—82)

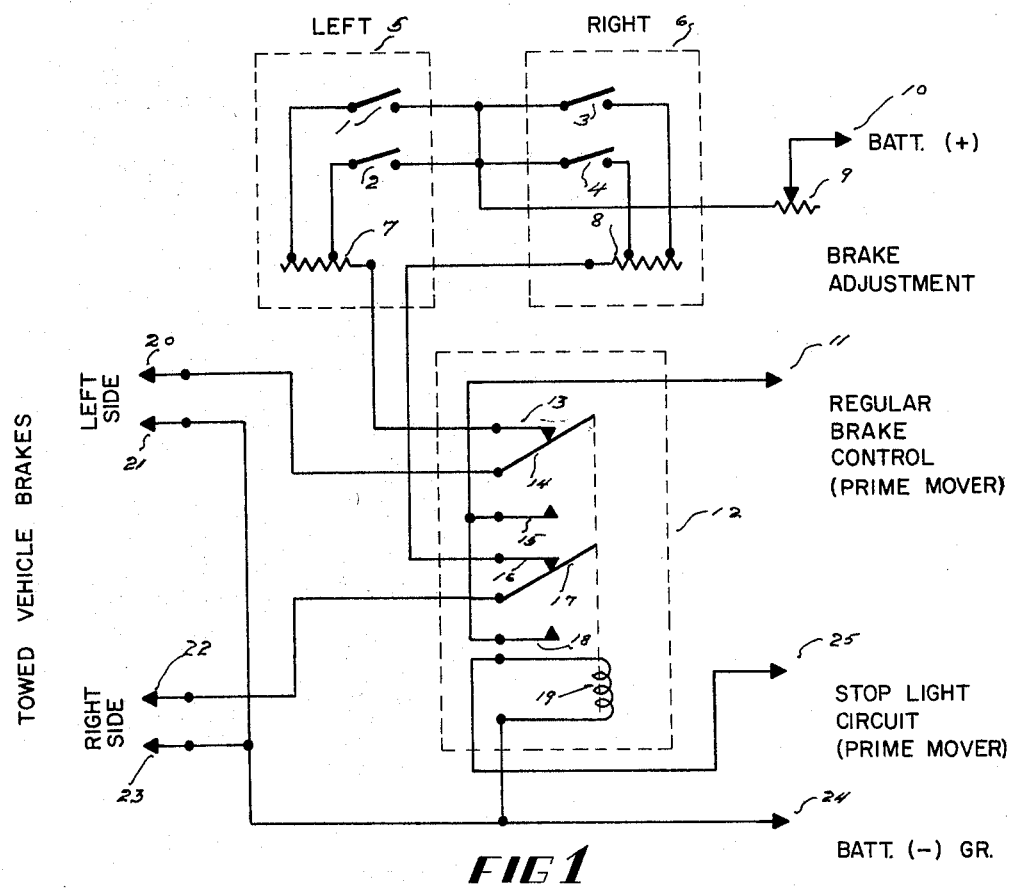
FIG 1
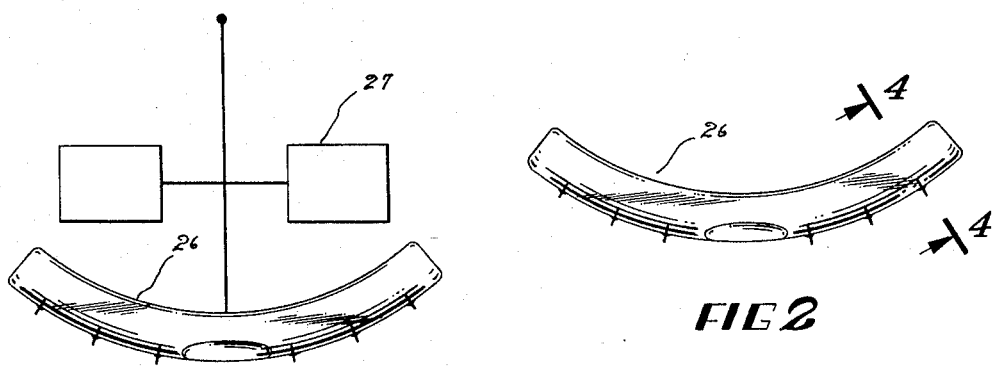
FIG 2
FIG 3
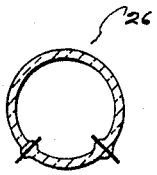
FIG 4
INVENTOR.
RICHARD M. FRANZEL
BY
ATTORNEY United States Patent Office 3,288,240
Patented Nov. 29, 1966

This invention relates broadly to means and method of imparting automatic stability control to ground vehicles and introduces a modified concept to provide stability control for ground vehicles other than that disclosed in my pending application for United States Letters Patent filed in the United States Patent Office of date, September 23, 1963, under Serial No. 310,687, now Patent No. 3,243,192, and entitled "Automatic Stability Control For Ground Vehicles."

This invention relates broadly to towed vehicles, such as travel trailers, utility trailers, and the like; and more specifically to automatic sensing and control means to overcome the inherent swaying and swerving tendency of such vehicles while the same are in over the road transit.

While this invention will primarily be concerned with trailer type vehicles as stated, it will be understood that the basic principles involved and embodied herein are equally adaptable to the prime-mover as well as the said towed vehicle.

It is well known that when a vehicle, particularly of the trailer type is moved at moderate and high speeds in over the road travel, there is an inherent tendency to sway or swerve from one side of the road or highway and to transmit such motion to its prime-mover through the trailer hitch and thus cause hazardous or dangerous driving conditions. This condition is generally brought about by factors such as travel over uneven road beds, making turns required in normal travel, encountering side or gusty winds, and meeting or passing in close proximity to large vehicles such as trucks and semi-trailers traveling at high speed wherein a vacuum or pressure area is created by the passage of such vehicle.

It will be further important to note that for the purpose of this application this embodiment of this invention is shown and described in detail for an electric brake system for vehicles, however, it is understood that comparable functions can be utilized so that this basic concept can be applied to all types of said brake systems.

With the foregoing in mind, the principal object of the invention is to provide automatic sensing and control of such swaying or swerving action of a vehicle or vehicle combination including the prime-mover and towed vehicle by means of sensing means cooperating with the wheel brake system of the towed vehicle and the prime-mover or a combination of both when regular brakes of prime-mover and towed vehicle are not being applied.

A further object of this invention is to provide an automatic stabilization system for a towed vehicle or a prime-mover wherein when said inherent swaying or swerving action which creates lateral acceleration forces are imposed on said vehicle in transit, sensing means mounted in said vehicle or said prime-mover is actuated. The signal therefrom is transmitted through an electric circuit to automatically apply wheel braking force to the appropriate side of the said vehicle when regular brakes of prime-mover and towed vehicle are not being applied, the said braking force applied only on one side of the vehicle causes a corrective force via the braking system to be applied to said vehicle, prime-mover or towed vehicle or a combination of both to thus minimize or eliminate the said lateral acceleration forces.

Another object of this invention is to provide an automatic stabilization system for ground vehicles of the towed or prime-mover type wherein said stabilization system is provided with a simple over-ride circuit which will automatically permit the use of the regular braking system.

Another object of this invention is to provide an automatic stabilization system for ground vehicles of the towed or prime-mover type wherein said stabilization system is provided with a means that permits the driver of said vehicle to select, while driving, the degree of automatic stabilization control desired so as driving and road conditions change brought about by factors such as rain, snow, sleet, high winds, etc., the driver can precisely adjust said stabilization system for best overall performance when traveling under variable road and driving conditions. Also, this feature permits precise matching of said vehicle load to the optimum degree of automatic stabilization control best suited to that combination. Specifically, this result is accomplished, in the arrangement herein disclosed, by placing a rheostat, within reach of the driver, in series with the electrical power to said stabilization system.

A still further object of this invention is to provide an automatic stabilization system for vehicles that is applicable to all types of braking systems including electric, hydraulic, mechanical or air, the only requirement of the said braking action being that the same can be independently applied to one side or the other of the said vehicle and/or proportionally and simultaneously to both sides thereof, for example at a 10 to 90% ratio.

Another object of this invention is to provide an automatic stabilization system for ground vehicles, particularly a vehicle towed by a prime-mover that is energized only by the storage battery and electric current of the prime-mover.

A still further object of this invention is to provide proportional braking wherein some braking action is applied to each side of a vehicle, but a greater amount to one side to accomplish similar results and may afford certain desirable safety features under certain conditions.

These and other objects of the invention will become apparent from the following specification and claims when taken in conjunction with the accompanying drawing which forms a part of this application and in which drawing, like characters indicate like parts throughout the several views.

All or combinations of the results heretofore enumerated may be used in systems embodying the features and objects of the present invention, and therefore in some cases certain of the devices hereinafter to be described may be eliminated without detriment to the proper and efficient functioning of the remaining devices.

To the above end, generally stated, the invention consists of the following devices and combination of devices, hereinafter described and defined in the claims.

Referring to the drawing:

FIG. 1 is a wiring diagram illustrating the electric circuit for operating one embodiment of the invention.

FIG. 2 illustrates one form of liquid switch of the mercury type embodied for the purpose of this application and for use in combination with the wiring diagram shown in FIG. 1.

FIG. 3 illustrates a suspension system for the liquid switch.

FIG. 4 is a sectional view of the mercury tube taken on the line 4—4 of FIG. 2.

While a liquid type switch which is used to measure lateral acceleration is referred to herein as the sensing means, it will be understood that there are many types and variations possible for the basic sensor.

These basic sensors may be simple contacts, snap switches, rheostat or potentiometer operated by a pendulum, axle displacement or hitch movement. For hydraulic, mechanical, or air systems, comparable sensors can be provided including hydraulic pistons actuated by axle displacement or "slide type" hitches now commonly used on hydraulic brake systems for towed vehicles. This sensor is required to pick up the lateral acceleration forces caused by swaying and swerving motions of the vehicle and thus provide a signal for the control system. However, in the interest of clarity and brevity, this application will be limited to the liquid type sensor above identified.

Referring more specifically to the drawing, FIG. 1 shows one form of a typical application of the electric brake system concept when applied to a towed vehicle such as a travel trailer or utility trailer, and the following is an explanation of the basic circuit functions as shown in FIG. 1.

Referring to FIG. 1 sensing units 5 and 6 are used to measure lateral acceleration forces applied to towed vehicle and comprise four mercury switches 1 and 2 for the left side and 3 and 4 for the right side of the vehicle and two current limiting resistors 7 and 8. Mercury switches 1 and 2, left side, and 3 and 4, right side, represent a two step braking action control. The mercury switches 1 and 3 are so they will close for a relatively minor lateral acceleration force in the respective directions, and switches 2 and 4 will close for a greater lateral acceleration force in the respective directions. Current limiting resistors 7 and 8 determine the amount of power applied to the brakes on any one side of the vehicle.

Override relay 12 is a double pole, double throw relay that can be actuated by the regular stop light or brake circuit on the prime-mover. When actuated, this relay 12 disconnects the mercury switch circuits and connects both left and right brakes on the towed vehicle together and to the regular brake control for the towed vehicle to thus restore normal brake operation.

Referring again to FIG. 1, the following is a sequence of operation in which corrective forces are applied to the vehicle to overcome or minimize the lateral acceleration forces caused by swaying or swerving movements of the towed vehicle induced by road, air current or turning action on the running gear or body portions of said towed vehicle. It should be noted that the prime-mover has contact with the ground on each of its four corners whereas the towed vehicle generally has ground contact only near its center also, the cross sectional area is usually considerably larger than said prime-mover thus, for a given disturbance said towed vehicle is inherently subject to greater lateral acceleration forces induced by swaying and swerving movements.

CONDITION A.—Towed vehicle only receives lateral acceleration to the left.

(1) Mercury switch 1 closes because of lateral acceleration to the left.

(2) Current from prime-mover battery flows through wire 10 and into brake adjustment rheostat 9 which is used to make semi-permanent adjustment for the degree of braking desired.

(3) Current flow continues through mercury switch 1 and all of resistor 7 which reduces the current to the desired amount for proper step 1 braking action.

(4) Current flow continues through relay contacts 13 and 14 and then to the left side brake/s 20 and 21 of the said towed vehicle.

(5) This causes a drag on the left side of the said towed vehicle which immediately causes a counteracting force in the opposite direction the lateral acceleration force originally caused, thus giving immediate correction to the towed vehicle and prime-mover combination.

(6) As soon as correction has been made, the mercury switch 1 will open because there is no lateral acceleration force to hold it closed, thus removing braking action on the left side of towed vehicle.

(7) If the lateral acceleration force is greater than above example, mercury switch 2 will also close, this action will then apply more power to the brakes because current will flow through only part of resistor 7. This condition will then apply step 2 correction and repeat the sequence of action as described above except the braking force will be greater because the lateral acceleration force is greater. It is understood that more steps could be provided on the mercury switch or a rheostat operated by a pendulum axle displacement, or hitch movement, could also be used.

CONDITION B.—Towed vehicle only receives lateral acceleration to the right.

(1) Mercury switch 3 closes because of lateral acceleration to the right.

(2) Same action takes place as in Condition A except current flows through resistor 8 and through relay contacts 16 and 17 and then to the right side.

(3) If greater swaying or swerving action takes place, mercury switch 4 will close and thus give greater braking action, the cycle of operation will be the same as for Condition A except the control action will be applied to the right side 22 and 23.

This concept embodies the following functions and principles:

(1) A sensing means that will sense the lateral acceleration forces experienced by the towed vehicle.

(2) A wheel braking system such that each side of the towed vehicle can be independently or proportionally and simultaneously controlled on both sides of said vehicle. This can be an electric, hydraulic, air, mechanical, etc. type system.

(3) A control system such that the lateral acceleration or side force caused by swaying and swerving as measured by the sensing means is counter-acted by the wheel brake/s in such a way as to reduce or eliminate this side force applied to the prime-mover and towed vehicle combination. In some cases it may be desirable to overcompensate so the initial swerving or swaying action of the prime-mover can be greatly reduced or eliminated.

(4) A control system such that when the main brakes of the towed vehicle are applied, the independent brake action of the towed vehicle will be eliminated.

There are many types and variations possible for the basic sensor. This sensor is required to pick up the lateral acceleration forces caused by swaying or swerving motion and thus provide a signal for the control system.

*Liquid switch.*—See FIG. 2, such as a mercury type switch wherein this sensor could be a single switch, one for each side of the vehicle or conversely provided with a series of contacts on each side of its tube so that the brake control action could be controlled in steps.

The sensor for the towed vehicle can be mounted in many possible locations, however, when it is mounted near the rear of the towed vehicle it provides a signal proportional to the lateral acceleration forces experienced by said towed vehicle.

The effect of high crowned roads has been considered and can be easily eliminated by mounting the mercury switch on a slow moving pendulum type suspension system, FIG. 3. This system will permit the basic switch to seek its proper position in relation to the road surface and thus permit accurate sensing of the lateral acceleration forces caused by the swerving or swaying motion of the said towed vehicle or prime-mover. In this form of the invention the tube 26 of the mercury switch is suspended from the pendulum having a slow moving dash pot 27.

It is further important to note that at slow speeds it may be desirable to eliminate the stability control action completely. This can be easily accomplished on the electric brake type system by providing a simple switch that will disconnect the battery power below a given speed, a simple governor type switch connected to the prime-mover speedometer can be used for this action. When no power is applied, see numeral 10, the stability system will not function and thus provide only normal brake action. Comparable functions can be used for other type brake systems such as hydraulic, air, and mechanical, however, as previously stated, it has not been thought necessary or proper to include all such modification in this application.

While there are herein disclosed but a limited number of embodiments of the structure, process and product of the invention herein presented, it is possible to produce still other embodiments without departing from the inventive concept herein disclosed, and it is desired, therefore, that only such limitations be imposed on the appended claims as are stated herein or required by the prior art.

What I claim is:

1. Automatic stability control means for a towed vehicle to overcome inherent undesirable effects of lateral acceleration forces due to swaying and swerving movements thereof when said towed vehicle is in motion, comprising in combination, automatic sensing means carried by said towed vehicle and activated by said lateral acceleration forces experienced by said towed vehicle in said motion, automatic means connecting said sensing means with wheel braking means of said towed vehicle, means to permit selective brake operation of said towed vehicle by said sensing means only when regular brakes of prime-mover and regular brakes of towed vehicle are not applied in normal way, said braking means of said towed vehicle powered by standard electric battery located in said prime-mover, said braking means being instantaneously applied on the side of said towed vehicle that receives outward lateral acceleration thereby causing corrective forces to be automatically applied to the appropriate side of said towed vehicle, thus minimizing the undesirable effects of said swaying and swerving thereof.

2. Automatic stability control means for a towed vehicle having electrically actuated braking means to minimize or overcome the inherent undesirable effects of lateral acceleration forces due to swaying and swerving movements thereof when said towed vehicle is in motion, said automatic control means comprising in combination, electrically energized sensing means carried by said towed vehicle and activated by said lateral acceleration forces experienced by said towed vehicle in said motion, said sensing means being connected by electric circuit means to said electric braking means on said towed vehicle with provisions for said sensing means to be disconnected by electric circuit means from said towed vehicle brakes when regular brake control means on the prime-mover is being applied, said braking means being instantaneously applied on the side of said towed vehicle that receives outward lateral acceleration thereby causing corrective forces to be automatically applied to the appropriate side of said towed vehicle, substantially as described.

3. Automatic stability control means as claimed in claim 2 wherein together with means on said towed vehicle to ensure said braking means being instantaneously and proportionally applied to both sides of said towed vehicle with reduction of braking action at the side from which the towed vehicle is swaying.

4. The means of imparting automatic stability control to a ground vehicle of the towed type to minimize or overcome the inherent undesirable effects of lateral acceleration forces due to swaying and swerving movements imparted to such vehicle in motion, such swaying and swerving acceleration forces being induced by ground or atmospheric factors acting on the running gear and body portion thereof, said automatic stability control comprising automatic electrical sensing means which is responsive to lateral acceleration forces and energized via an electric current from the conventional storage battery current of such vehicle, said sensing means being in the form of an accelerometer of the mercury switch type mounted on said towed vehicle and activated by said swaying and swerving lateral acceleration forces of such towed vehicle in said motion, said accelerometer being connected in series with said electric braking system of said towed vehicle via an electric circuit energized by said storage battery current thereof with provisions for said accelerometer to be disconnected by electric circuit means from said towed vehicle brakes when said regular brake control means on the prime-mover is being applied, whereby when said swaying and swerving lateral acceleration forces are applied to said towed vehicle in one direction said accelerometer is instantly closed thereby instantaneously and automatically energizing one side of said braking system thereof to minimize or overcome undesirable effects of said lateral acceleration forces, substantially as described.

5. The structure of claim 4 wherein said accelerometer of the liquid switch types is so constructed and arranged wherein a single switch having at least two sets of contacts to open and close the same according to the magnitude of lateral acceleration forces experienced by said toward vehicle, each said set of contacts electrically connected in series with a fixed electrical resistance selected on the basis of said braking action desired, each said set of contacts and said resistance combination electrically connected in series with said electrical braking system to thus afford at least two steps of controlled braking action for each side of said towed vehicle.

6. The structure of claim 4 wherein said accelerometer with given operating characteristics is mounted on a slow moving pendulum type suspension system whereby the zero reference position of said accelerometer will be automatically positioned by said suspension system to its proper position relative to road surfaces, the movement of said suspension system is restricted so momentary normal swaying and swerving lateral acceleration forces will not appreciably affect said suspension system position.

7. Automatic stability control means as claimed in claim 4 including independent manually controlled means for adjusting degree of said braking action, said manually controlled means being in the form of an adjustable electrical resistance connected in series with said electrical power to said sensing unit.

8. The structure of claim 4 wherein said adjustable electrical resistance is located in said prime-mover vehicle and within reach of driver of same.

References Cited by the Examiner

UNITED STATES PATENTS

| | | | |
|---|---|---|---|
| 999,012 | 7/1911 | Danziger | 200—61.52 X |
| 1,175,062 | 3/1916 | Johnson | 200—61.52 X |
| 2,152,017 | 3/1939 | Banning | 188—112 |
| 2,856,036 | 10/1958 | Mullen | 188—112 |
| 2,917,126 | 12/1959 | Phillips | 180—82 |
| 2,956,633 | 10/1960 | Nolan | 180—82 |
| 3,053,348 | 9/1962 | Stair | 188—158 X |
| 3,154,320 | 10/1964 | D'Avigdor | 280—112.1 |

KENNETH H. BETTS, *Primary Examiner.*